United States Patent [19]

Kamysz et al.

[11] Patent Number: 5,305,915
[45] Date of Patent: Apr. 26, 1994

[54] LIQUID DISPENSING PUMP WITH SPLASH MINIMIZING ADJUSTMENT AND VOLUME DISPENSING ADJUSTMENT

[75] Inventors: Richard A. Kamysz, Roselle; Nhon T. Vuong, Lombard, both of Ill.

[73] Assignee: Sloan Valve Company, Franklin Park, Ill.

[21] Appl. No.: 947,420

[22] Filed: Sep. 18, 1992

[51] Int. Cl.[5] ............................................. B67D 5/08
[52] U.S. Cl. ...................................... 222/63; 222/642
[58] Field of Search .................. 222/52, 63, 642, 639, 222/71, 333

[56] References Cited

U.S. PATENT DOCUMENTS

| | | | |
|---|---|---|---|
| 3,419,188 | 12/1968 | Matchett | 222/52 |
| 3,665,980 | 5/1972 | Croslin et al. | 222/63 |
| 4,189,067 | 2/1980 | Nottke et al. | 222/63 |
| 4,938,384 | 7/1990 | Pilolla et al. | 222/63 |
| 4,967,935 | 11/1990 | Celeste | 222/63 |
| 5,186,360 | 2/1993 | Mease et al. | 222/63 |

Primary Examiner—Andres Kashnikow
Assistant Examiner—Philippe Derakshani
Attorney, Agent, or Firm—Kinzer, Plyer, Dorn, McEachran & Jambor

[57] ABSTRACT

A soap dispenser utilizes an infrared sensor for detecting the presence of an object upon which soap will be dispensed. There is a source of soap and a pump connected thereto. A voltage regulator having an adjustable output voltage to control the force at which soap is dispensed, and which may be considered a method of accommodating viscosity of soap, is connected to the pump. The sensor controls operation of the pump and there is an adjustable timing circuit to control the amount of time the pump operates and hence the volume of soap dispensed. A prime circuit is included to prime the pump as conditions require.

10 Claims, 1 Drawing Sheet

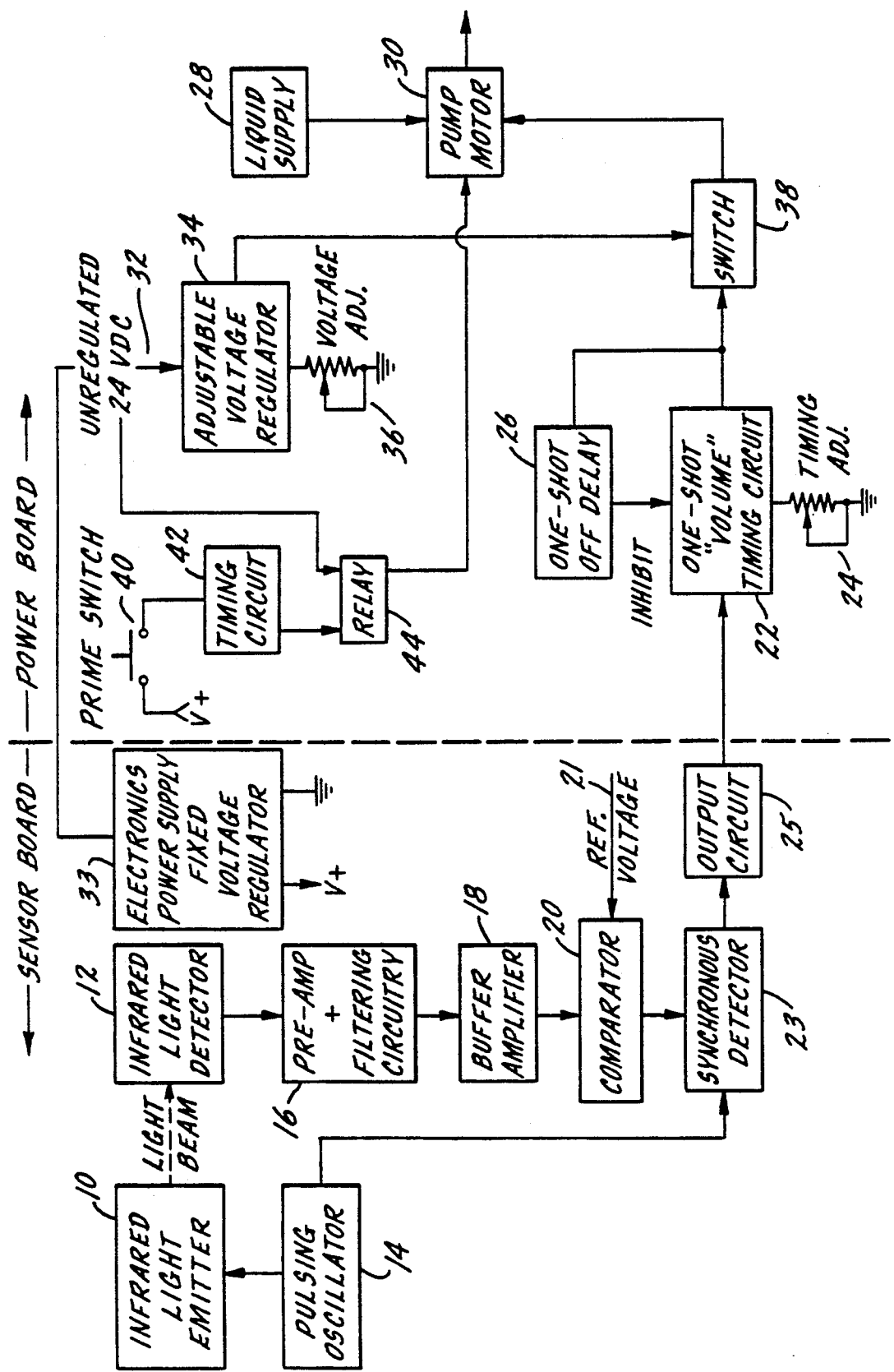

LIQUID DISPENSING PUMP WITH SPLASH MINIMIZING ADJUSTMENT AND VOLUME DISPENSING ADJUSTMENT

BACKGROUND OF THE INVENTION

The present invention relates to soap dispensers of the kind found in public washrooms and in other types of washrooms, for example scrub rooms in hospitals, where the dispenser is to be operated without hands-on or manual control. The soap dispenser is operated by a sensor, for example infrared, and will provide a measured amount of soap when the hands of the person desiring the soap are placed within the path of the sensor. Since soap is supplied in various viscosities, depending upon the particular application, and since it is important that the soap not be splashed when dispensed, there is a viscosity or thickness control to accommodate soaps of different viscosity. There is also a timing circuit which controls the volume of soap or the time during which the pump will actually dispense soap. Further, the invention includes a priming circuit to prime the pump as required.

The invention is described particularly in connection with a soap dispenser, although it has application in any environment in which it is desired to dispense a liquid having a viscosity greater than that of water and in which it is desired to control the force at which the viscous liquid is dispensed and also the time period of operation. In this context, the invention has application in the dispensing of condiments such as ketchup, mustard, salad dressing, etc., and in dispensing cosmetic products such as shampoo, lotion, and conditioners, etc.

SUMMARY OF THE INVENTION

The present invention relates to a dispenser for liquids having a viscosity equal to or greater than water and is particularly directed to a soap dispenser for use in washrooms in which the soap is to be dispensed without the use of manual controls.

A primary purpose of the invention is a liquid dispenser as described which includes means for adjusting the power supplied to the pump and thus the force at which the liquid is dispensed, and means for adjusting the volume by controlling the time period during which liquid will be dispensed.

Another purpose is a liquid dispenser as described which has application in the field of soap, as well as other viscous liquids such as ketchup, mustard, salad dressing, shampoo, lotion, conditioners, etc.

Another purpose is a soap dispenser as described which includes a prime circuit and means for limiting the duration of the priming operation.

Another purpose is a sensor-operated soap dispenser as described in which the discharge force of the soap dispenser, the time during which it operates and the interval between operations is controlled.

Other purposes will appear in the ensuing specification, drawing and claims.

BRIEF DESCRIPTION OF THE DRAWING

The invention is illustrated diagrammatically in the attached block diagram illustrating a preferred form of the invention.

DESCRIPTION OF THE PREFERRED EMBODIMENT

As mentioned above, the present application will be described in connection with a soap dispenser of the type used in public washrooms and in hospital washrooms where it is essential that there be no manual controls to be operated by the individual desiring soap. Since the invention is basically concerned with a system for controlling the supply of a viscous liquid such as soap, it is also applicable to environments in which it is desired to dispense other types of viscous liquids on a no-touch or hands-off basis. Thus, the invention has application in the dispensing of substances such as ketchup, mustard, salad dressing, shampoo, lotion, conditioners, etc., as well as in other environments in which liquids having a viscosity greater than water are to be dispensed on the described basis.

The sensor will be described in brief form and may be of the infrared type or it may be otherwise. The particular sensor described is used by the assignee of the present application, Sloan Valve Company, for the control of a number of toilet room devices such as faucets, flush valves, soap dispensers and hand dryers. The sensor is more particularly described in U.S. Pat. No. 4,938,384 owned by Sloan Valve Company, with FIG. 5 of the '384 patent being similar to the sensor portion of the drawing in the present application.

In the drawing, an infrared light emitter is indicated at 10 and provides a beam of infrared light directed toward a infrared light detector 12. A pulsing oscillator 14 controls operation of the light emitter which will be intermittently energized. The detector 12, when energized by light from emitter 10, provides a signal to a pre-amp and filter 16 which amplifies and includes an integrator for effectively filtering any ambient light received from the detector to provide a clean output signal representing the detection of a continuous light beam indicative of a condition in which no user's hands are present to break the beam.

A buffer amplifier 18 is connected to pre-amp 16 and the continuous application of output signal from circuit 16 will maintain the sensor-operated circuits in an inactive state. When the light beam is broken, the output signal from circuit 16 changes amplitude to which the following described circuits will respond.

Buffer amplifier 18 is connected to comparator 20 which compares the received signal level with a reference voltage 21 and if there is the appropriate relationship between signal levels will provide an output to synchronous detector 23. Detector 23 receives an input from pulsing oscillator 14 and if the signal from comparator 20 is coincident in time with the oscillator pulse which triggered the sensor emitter a signal will be passed to output circuit 25 which provies a clean predetermined DC level at its output. Output circuit 25 is connected to volume timing circuit 22 which is controlled by timing potentiometer 24. The output of the timing circuit, as controlled by the sensor, is a pulse, the duration of which is controlled by the timing adjustment potentiometer, and which may for example vary from 150 to 1500 milliseconds. A delay circuit 26 is connected to timing circuit 22 to inhibit continuous operation of the soap dispenser brought about by the continued presence of the hands of the user. The delay circuit protects the pump and prevents an overuse of soap.

A liquid supply is indicated at 28 and will be conventionally be filled with soap of a desired type and viscosity. Supply 28 is connected to a pump motor 30, the output from which will be a controlled discharge of soap.

An unregulated supply of 24-volt DC power indicated at 32, which may be taken from a power supply 33, is supplied to a voltage regulator 34. Regulator 34 has a power adjust potentiometer 36 which has the effect of controlling the voltage supplied by regulator 34 to a switch 38 which may be of any suitable electronic type. Switch 38 is connected to pump motor 30 and is also connected to timing circuit 22. Thus, the detection of an object by the sensor circuit will provide operation of switch 38 for a time period determined by potentiometer 24 so that a voltage at the level controlled by power adjust potentiometer 36 will be supplied to pump 30. The applied voltage determines the power supplied to the pump, and thus the force at which soap is dispensed. The time duration of the applied voltage which controls the volume of soap dispensed is controlled by timing adjust potentiometer 24.

It is occasionally necessary to prime the pump, either when there has been no use for a considerable period of time or when a new supply of soap has been connected to the pump. Also, the prime switch can be used to clean the pump and associated plumbing via purging with water, alcohol, etc. The prime circuit includes a prime switch 40 connected to a timing circuit 42 which controls the duration of the priming operation. Timing circuit 42 is connected to a relay or other suitable type of switching device indicated at 44, with the relay 44 receiving an input of the unregulated 24-volt DC power from source 32. When the prime switch is closed, the unregulated 24-volt DC power will be supplied through relay 44 directly to pump motor 30. Thus, the pump will operate continuously for a period determined by timing circuit 42 to prime the dispensing system.

Because soap can be supplied in a wide range of viscosities or thicknesses, it is important to have an adjustable viscosity or thickness control to prevent splashing of soap on the user. Thus, the force at which the pump operates can be controlled to be consistent with the viscosity of the liquid. The dispensing device also includes a volume control so that the volume can be controlled consistent with the normal user requirements. The controls described can be used on a variety of different pumps such as centrifugal force, piston, peristalic, etc.

Whereas the preferred form of the invention has been shown and described herein, it should be realized that there may be many modifications, substitutions and alterations thereto.

The embodiments of the invention in which an exclusive property are claimed are defined as follows:

1. A sensor-operated dispenser for liquids having a viscosity equal to or greater than water including a sensor for detecting the presence of an object upon which such liquid will be dispensed, a source of such liquid and pump means connected thereto for dispensing liquid from said source, circuit means connected to said sensor and responsive to the detection of the presence of an object thereby for supplying operating power to said pump means, said circuit means including a voltage regulator for supplying power to said pump means, and means for adjusting the output voltage of said voltage regulator to control the force at which the liquid is dispensed by said pump means, switch means connected between said voltage regulator and said pump means, a signal from said sensor detecting the presence of an object upon which liquid will be dispensed controlling the operation of said switch means, a timing circuit connected between said sensor and said switch means, and means for adjusting the time period of said timing circuit to control the volume of liquid dispensed by said pump means.

2. The liquid dispenser of claim 1 further characterized by and including a delay circuit connected to said timing circuit to control the interval between successive operations of said pump means.

3. The liquid dispenser of claim 1 further characterized by and including means for priming said pump means.

4. The liquid dispenser of claim 3 further characterized in that the means for priming said pump means includes a prime switch, a timing circuit, and means for bypassing the voltage regulator and connecting the input thereto to said pump means upon closure of said prime switch.

5. The liquid dispenser of claim 1 further characterized in that said sensor includes a source of infrared radiation and an infrared detector.

6. The liquid dispenser of claim 1 further characterized in that said liquid is soap.

7. A sensor-operated soap dispenser including a sensor for detecting the presence of an object upon which soap will be dispensed, a source of soap and a pump connected thereto for dispensing soap from said source, a voltage regulator having output voltage adjustment means therewith, a switch connecting said voltage regulator to said pump, with said voltage adjustment means controlling the voltage applied to said pump and thus the force at which soap is dispensed, said sensor being connected to and controlling operation of said switch to control operation of said pump, a variable timing circuit connected between said sensor and said switch for controlling the duration at which voltage is applied to said pump, and a delay circuit connected to said timing circuit for controlling the period between successive operations of said pump.

8. The soap dispenser of claim 7 further characterized by and including means for priming said pump.

9. The soap dispenser of claim 8 further characterized in that said priming means includes a prime switch and a timing circuit for controlling the duration of the application of a voltage to said pump.

10. The soap dispenser of claim 9 further characterized by and including relay means connected between said timing circuit and the input to said pump, with the operation of said prime switch applying the input voltage directly to said pump, through said relay.

* * * * *